United States Patent [19]

Salvador et al.

[11] Patent Number: 5,795,365
[45] Date of Patent: *Aug. 18, 1998

[54] METHOD OF PRODUCING AND TREATING GLASS THREADS BY BLOWING DRIED AIR ACROSS COATED FIBERS

[75] Inventors: Yvan Salvador, Chambery; Dominique Gerard, La Motte Servolex; Eric Huet, Barberaz, all of France

[73] Assignee: Vetrotex France, Chambery, France

[ * ] Notice: The term of this patent shall not extend beyond the expiration date of Pat. No. 5,443,611.

[21] Appl. No.: 870,359

[22] Filed: Jun. 6, 1997

Related U.S. Application Data

[63] Continuation of Ser. No. 405,947, Mar. 17, 1995, abandoned, which is a continuation of Ser. No. 165,510, Dec. 13, 1993, Pat. No. 5,443,611.

[30] Foreign Application Priority Data

Dec. 11, 1992 [FR] France ................... 92 14910

[51] Int. Cl.$^6$ .................................. C03B 37/022
[52] U.S. Cl. .................. 65/443; 65/447; 65/453; 65/532; 34/446; 34/449; 427/389.8
[58] Field of Search .................... 34/78, 77, 446, 34/449; 427/389.8; 65/443, 447, 453, 500, 507, 529, 539, 450, 532

[56] References Cited

U.S. PATENT DOCUMENTS

| 2,445,443 | 7/1948 | Long | 34/77 |
| 3,283,414 | 11/1966 | Crouzet | 34/77 |
| 3,304,163 | 2/1967 | Holschlag . | |
| 3,717,448 | 2/1973 | Smith | 65/3 |
| 4,049,415 | 9/1977 | Dent | 65/532 |
| 4,105,424 | 8/1978 | Levecque | 65/532 |
| 5,011,523 | 4/1991 | Roncato | 65/2 |
| 5,055,119 | 10/1991 | Flautt | 65/3.1 |

OTHER PUBLICATIONS

Van Nostrand's Scientific Encyclopedia, pp. 1566–1567 1983.

*Primary Examiner*—John Hoffmann
*Attorney, Agent, or Firm*—Oblon, Spivak, McClelland, Maier & Neustadt, P.C.

[57] ABSTRACT

A thread is formed of one or a plurality of fans of continuous filaments on which a sizing composition is deposited. The moisture content on the thread is controlled by subjecting the fans of filaments to a current of air transversely to the direction of movement of the filaments between the zone in which the size is deposited and the zone in which the filaments are gathered together.

8 Claims, 2 Drawing Sheets

FIG_1

METHOD OF PRODUCING AND TREATING GLASS THREADS BY BLOWING DRIED AIR ACROSS COATED FIBERS

This application is a Continuation of application Ser. No. 08/405,947, filed on Mar. 17, 1995, now abandoned; which is a continuation of Ser. No. 08/165,510, filed on Dec. 13, 1993; now U.S. Pat. No. 5,443,611.

BACKGROUND OF THE INVENTION

1. Field of the Invention

The present invention relates to a method of producing and treating glass threads and, more particularly, to a method of producing and treating glass threads including a step in which the glass threads are dried after the size has been deposited, as well as to a device for performing this method.

2. Description of the Related Art

In glass thread production, thin streams of glass are drawn jointly, in the form of one or a plurality of fans of filaments, through a die plate from a mass of molten glass and the filaments are then covered with a coating known as "size" intended to impart to them specific properties essential for subsequent handling or transformation operations, this occurring before filaments are gathered together in one or a plurality of basic threads. These threads can then be wound onto rotating supports before being subjected to other operations typically associated with organic threads, or even cut into sections after formation.

The drawing speeds are generally fast (several tens of meters per second), the number of filaments high (several hundred to several thousand) and their diameter small (a few microns). The application of size, intended to protect the threads against abrasion and connect the filaments while imparting the above properties to them, must thus be suitable for these glass thread production systems. However, it is difficult to control the amount of size retained by the threads, which frequently results in an excess of size being deposited as a precautionary measure. The size composition contains a large proportion of generally aqueous solvent which has to be eliminated, whereas the active compounds present in the size are fixed on the threads. But the elimination process is frequently poorly controlled or too late. Some of the solution is lost at the gathering device as a result of friction or during winding as a result of centrifugal force. Residual moisture, generally on the order of 10% by weight, nonetheless remains which should be removed to a greater or lesser extent depending on manufacturing requirements and the applications for which the threads are intended.

Particularly when the threads are in the form of windings, some methods provide for drying by stoving when the threads have been produced. However, as well as involving an additional operation, these methods pose the problem of the size migrating within the windings. Indeed, the aqueous solution moving towards the periphery of the windings before it evaporates entrains the active components of the coating such that the final concentration of size is far greater on the parts of the threads at the periphery of the winding that on the parts of the threads located at the center of the winding. Once the ends of the threads have been unwound, they are useless since there is too great a disparity between their properties and they have to be removed, which involves further waste of material and time. In addition, owing to the fact that the components of the size solution have a variable affinity with glass, the migration process occurs selectively, the effect being that the composition of the size solution covering the threads in the winding varies with respect to the composition of the size as initially deposited on these same threads. Thus, for these two reasons, this migration phenomenon results in irregular thread windings, leading to products which are not homogeneous and which are, consequently, unsatisfactory.

In addition to the migration phenomena, there are sometimes also phenomena of coloration of the threads at the periphery of the windings, these phenomena being caused by the use of certain gases within the ovens, as well as phenomena of deformation of the windings during stoving under the effect of steam pressure when there is a large amount of water to be removed. In both cases, the threads which have been modified in this way cannot be used.

It is also known to dry the threads directly below the sizing device using a microwave cavity (U.S. Pat. No. 3,653,860). These processes are rapid and efficient but are only useful for threads with a low count (less than 450 tex). Indeed, the power which can be used within these cavities is limited, firstly, by the power of the generator used and, secondly, due to the electrical discharges which occur above a given power level and which are due to the ionization of the air and to humidity. Thus, it is impossible to dry all types of thread and, in particular, rovings with a high count.

It is further known to dry the filaments before the gathering comb, using the air heated by the die (WO Patent 92/05122). This air is entrained by the moving filaments and is channeled to the point at which the filaments are gathered together. Here again, a process of this type is of limited application since it does not permit adaptation according to the type of thread produced. Indeed, it is impossible to control the amount of air used or its temperature, said amount being imposed by the drawing speed and number of filaments, and the temperature produced by the die.

SUMMARY OF THE INVENTION

A first object of the invention is to provide a method which does not entail the above disadvantages, integrating a drying step within the thread-production method (this method is thus a direct method), it being possible for this drying step to be applied to any type of moving, coated thread and being adjustable according to the type of thread which is to be produced and the ultimate applications of said thread. In effect, it is a matter of controlling the amount of moisture on the threads by a suitable drying process. This process increase productivity and efficiency, taking account of manufacturing requirements.

A further object of the invention is to provide a more economical method of producing and treating glass threads by eliminating or considerably reducing the need to resort to an additional stoving step for the threads, this method also being more economical since it enables the size to fix better on the threads by removing the moisture earlier, thus leading to a saving in the amount of size applied. This method is also more economical since it does not involve losses owing to the problems of migration, coloration, or deformation in the windings which may be produced. Finally, this method is economical with respect to the energy used during the drying step. The fact that the stoving step is eliminated or curtailed also eliminates the need to create aerated windings in which the angle of intersection of the threads of two consecutive layers is large, thereby facilitating the evacuation of the water vapor. The windings can then be of more compact shape with a smaller angle of intersection of the threads.

A third object of the invention relates to a drying device for performing the method according to the invention, which can be modified as a function of the operating conditions and which allows an adequate drying of any type of glass thread, this device being easily movable, reliable and economical, as well as adjustable and controllable, and able to dry highly diverse amounts of liquid depending on manufacturing requirements, and in particular very large amounts of liquid when the counts of threads or drawing speeds are high.

These objects are achieved, firstly, by means of a method for producing and treating glass threads, according to which a large number of thin streams of molten glass, flowing from a large number of apertures disposed at the base of a die plate, are drawn in the form of one or a plurality of fans of continuous filaments, and a sizing composition is deposited on these filaments, and a sizing composition is deposited on these filaments before they are gathered together to form one or a plurality of threads, in which the amount of moisture on the thread is controlled by drying the filaments by subjecting said fans of filaments to at least one current of air directed transversely to the direction in which said filaments move, over at least part of the distance travelled by the filaments between the zone in which the size is deposited and the zone in which the filaments are gathered together.

In accordance with a preferred embodiment, the method according to the invention also enables the air used to be recycled.

The invention also relates to a drying device for performing the method as defined above, in the form of a chamber which is in two parts located on either side of the fan of filaments to be dried, a first part comprising a device for blowing air at an adjustable flow rate, a device for removing the moisture of the used air, and a device for heating the air, both also being adjustable, and a second, movable part which closes the first part at one of its ends such that the fan of filaments passes between the two parts.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
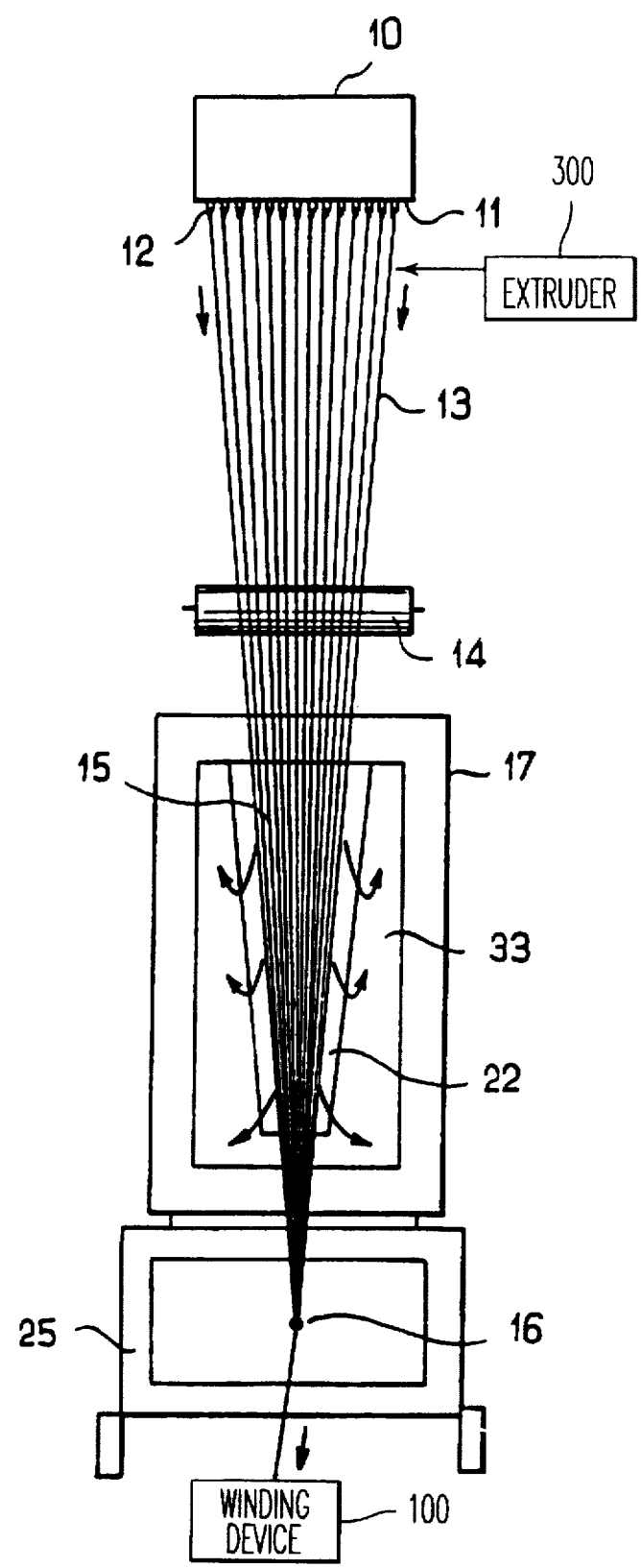
FIG. 1 is a schematic front elevation view of a device for performing the method according to the invention.

It will be appreciated that the above-mentioned embodiments are in no way limitative but purely illustrative.

According to one of these embodiments, as shown schematically in FIG. 1, the method of producing and treating the glass threads is performed as follows:

Molten glass is fed to the die 10 from which it flows by gravity through plates 11 provided with several hundred apertures 12.

On emerging from the die plates, the thin streams of glass are drawn mechanically at high speed to produce a fan 13 of continuous filaments of small diameter.

After the drawing step, the filaments are coated with the sizing composition by means of a conventional sizing device 14 before assuming the form of a flat fan 15 at the level of the drying device 17. A flow of air is then applied transversely to the plane of the vertically advancing fan, in order to evaporate the moisture deposited on the surface more or less completely, before the filaments are gathered together into a thread at the assembly wheel or comb 16, followed by the entrainment of the thread on winding device shown schematically as 100 in FIG. 1.

The advantages of drying the glass threads under the sizing device, while they are still in the form of a dispersed fan of filaments, is that the heat exchange surface area is larger. Thus the drying process is greatly facilitated as compared to threads or windings for which the surface area is reduced and the thickness of material to be dried is larger.

Efficiency is increased even further by the fact that air, brought to a temperature which can also be varied, is blown at a flow rate which is selected and can be adjusted such that the drying process is optimized according to the speed at which the filaments move and the weight of liquid to be dried. A third adjusting element concerns the moisture content of the air used. The air in the vicinity of the industrial installations for producing glass threads is already highly charged with moisture. The advantage of using air which is dried rather than the simpler method of using ambient air is that dry air dries the threads more quickly without the need to resort to excessive air heating temperatures when there is a large amount of water to be eliminated.

For all these reasons, the device according to the invention permits a more efficient drying process under the most diverse operating conditions. Preferably, the air flow rate before heating can vary and can be as high as 1 $Nm^3/s$. The air temperature can be between 20° and 600° C., and the moisture content of the air is less than 10%. According to a particularly preferable embodiment of the invention, the moisture content of the air used is less than 1%.

The application of the current of air transversely to the fan of filaments also fulfills several requirements concerning the practical aspects of the mounting of the hot air blower device. It is easier to incorporate a drying module at the side of the already existing thread-production system than to attempt to mount, on the axis along which the threads move, a system blowing air in the direction in which said threads move. It is also easier to separate a system of this type from the existing thread-production system. Furthermore, as illustrated below with reference to FIGS. 2 and 3, a system of this type enables the used air to be recycled more conveniently. In addition, since the flow of blown air neither accompanies the moving filaments nor flows towards them, it does not risk disturbing their speed of displacement. Finally, this system enables the excess water to be removed satisfactorily from the fan filaments at the same time as it dries them, which further improves the drying process.

In the case of the windings, it is important to dry the threads to an advanced degree before they are wound in order to avoid subsequent problems, in particular with respect to migration. The process according to the invention enables this drying process to be performed by varying the flow rate, the temperature, and the moisture content of the air used for drying, whatever the count of the resultant threads. This is valid for conventional windings of threads having counts of up to 1200 tex and also for direct rovings with a high count of the order of 4800 tex and more, which was generally impossible with the prior art.

According to a further method of performing the invention using the installation as described in FIG. 1, the thin streams of glass are drawn from a die 10 to form a fan 13 of continuous filaments which are coated using a sizing device 14 before being dried using a device 17 which blows hot, dry air. The filaments are then gathered together by an assembly wheel or comb 16. The threads are then cut by a device formed by an anvil wheel or "cut roll" and a blade-carrier wheel (a "cutter roll") which are schematically as 200 in FIG. 2, this device also being used to draw them according to a technique known per se.

In the case of cut threads, it should be pointed out that drying before cutting is less important, the moisture preventing certain separation of the filaments and flock problems. But the advantage of the method according to the invention is to allow the drying process to be adapted to the operating conditions and thus to leave a given proportion of moisture on the threads for the purpose of cutting under the die.

The method according to the invention thus enables the drying of the filaments to be modified not only according to the count of the threads which are to be obtained but also as a function of the drying intensity which is to be performed.

According to a third method of performing the invention, it is also possible to draw the glass threads from a die plate to form a fan of filaments which are coated by a sizing device, before they are dried, using the device according to the invention for blowing hot, dry air, and gathered together. Simultaneously, a thermoplastic organic material is extruded by the extruder shown schematically as 300 in FIG. 1 and carried along, the paths followed by the glass filaments and the organic material converging before the material and filaments are combined to form at least one composite strip or thread according to a process such as is described in Patent Application EP-A-0 367 661. Here again, the drying process can be modified according to the characteristics of the composite to be obtained.

It is self-evident that, irrespective of the method of production used, the filaments can be in the form of a plurality of adjacent fans instead of a single fan at the drying device, and that the filaments can be gathered together in a plurality of threads instead of a single thread. In all cases, threads of counts of up to 4800 tex and more can be dried.

Figure 2:
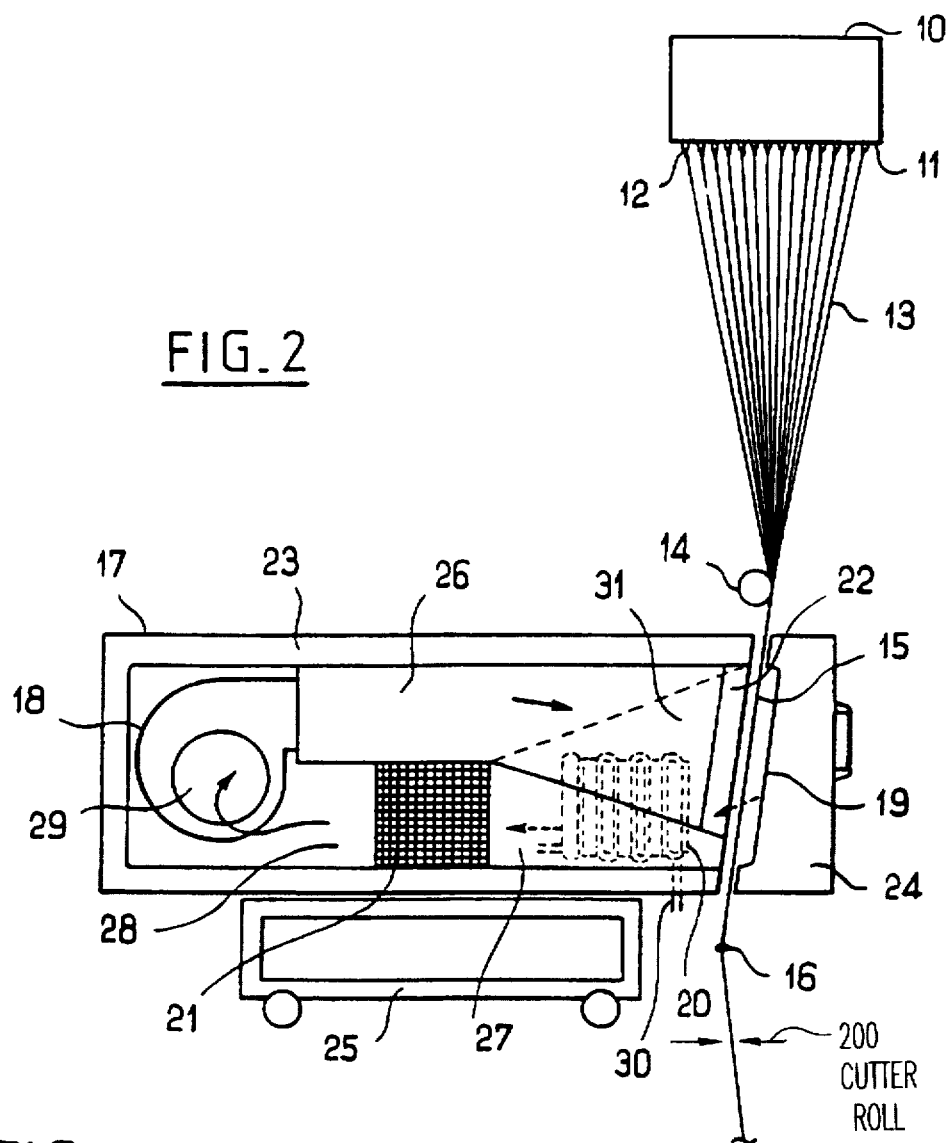
FIG. 2 is a schematic side elevation view of a device for performing the method according to the invention.

Furthermore, irrespective of the method of production used, the used air is preferably recycled, as is shown more specifically in FIG. 2. According to this Figure, the hot air is blown, via a turbine 18, in the direction of the moving fan. The hot air flows through a first pipe 26 and past the fan of filaments 15 before being deflected back by a deflector wall 19 and returned to the drying system via a further pipe 27.

In this circuit, the air passes through the fan of filaments 15 and is thus charged with moisture. It is then dried in the pipe 27 by low temperature condensers 20, before being reheated by a series of resistors 21 and returned via the turbine 18 in the direction of the filaments to be dried. By virtue of this recycling system, the energy used in the drying system is reduced, which also renders the method more economical.

Any type of die can be used to create the thin streams of glass necessary for producing the threads. Likewise, the thin streams of glass can be drawn by any mechanical means conventionally used in devices for producing and treating glass threads. The filaments are also coated and gathered together by devices known, per se, in conventional fiber-drawing installations.

According to the embodiment of the invention as illustrated in FIG. 2, the drying device is in the form of a chamber 17 in two parts 23 and 24 surrounding the fan of filaments. The widths of the inlet slot and outlet aperture for the fan of filaments are adjusted to prevent air escaping at these points. Thus, the air circulates in a closed circuit and is prevented from returning to the sizing system or the die. In addition, this closed circuit protects then operators of the device from the hot drying air.

The air blower device or turbine 18 is, preferably, a high-temperature ventilator. Likewise, movable, and in particular copper, condensers 20 are preferably used to dry the moisture in the air. The condensates are then evacuated via the bottom of the chamber by tubes 30.

The air heating device 21 can be any adjustable heating device. It is generally coupled to a diffusion grille. A battery which is made of spiral wound nickel carbide elements and which can reach a temperature of up to 600° C. is preferably used.

By virtue of the fact that it can be moved, the movable part 24 closing the chamber provides access to the fan of filaments for the operators when restarting the system. If the thread breaks, the operator must be able to gather up the filaments by hand and move them easily, not only to ensure that the system can be restarted but also to remove any broken fibers from the drier. The operator must thus have access to the fan of filaments and, during the entire restarting procedure, he should be in front of this fan. The movable door system thus provides access to the fan and so its opening should cause the blowing process to stop, e.g., by an open door detector shutting off power to the turbine 18, to prevent hot air being sent in the direction of the operator.

Preferably, the chamber is mounted on a moving chassis 25 which can be moved to free the work station. An unlocking system, mounted on the side of the chassis, also enables the slot between parts 23 and 24 for the passage of the fibers to be positioned accurately. The chassis can be moved along a guide rail used to position the fan assembly laterally.

Figure 3:
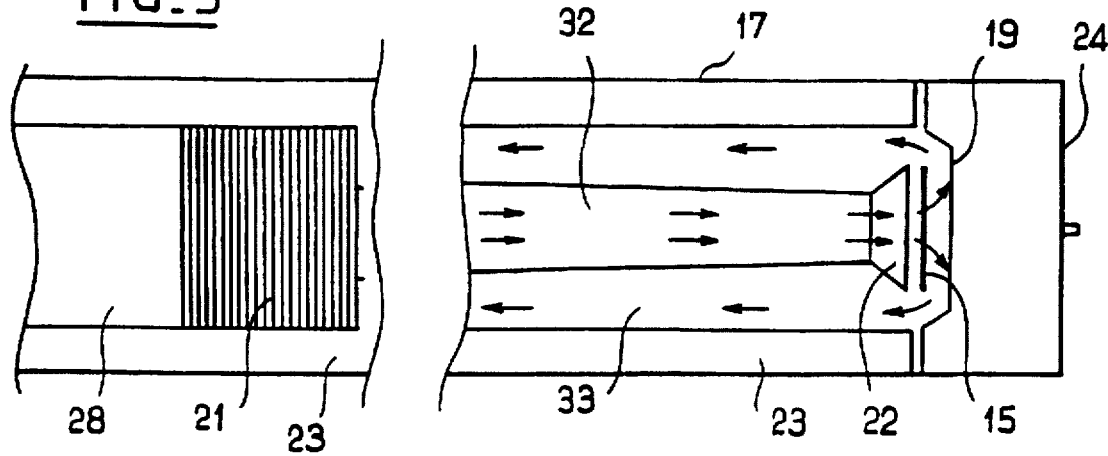
FIG. 3 is a schematic plan view of a drying apparatus according to the invention, showing the operating principles of a device of this type.

The movable part 24 also acts as a deflector, thus enabling moist air to be evacuated back to the turbine. According to a preferred embodiment of the invention, the device operates in a closed circuit, which allows the air to be recycled. The closed circuit can be designed in the following manner, as illustrated in FIGS. 2 and 3:

The turbine 18 is installed at the rear of the fan chamber and the air outlet is in communication with an air intake pipe 26. Intake pipe 26 is itself connected to a blower casing 31 located in the central part 32 of the chamber to form ducting and allows the current of air to be applied to the fan 15 via an aperture 22. The aperture 22 is adapted to the shape of the fan and has a slightly larger cross-section than the fan. According to a particularly preferable embodiment of the invention, this aperture has a trapezoidal cross-section, as shown in FIG. 1. An air recovery casing 27 in the chamber part 33 is located on either side of the aperture as FIG. 1 also shows, to allow the return of the air deflected back by the inner part 19 of the door 24. The casing 33 is connected to an air return pipe 28 in which the heating elements 21 are located. Two movable condensers 20, not illustrated in FIG. 3, are located in the recovery casing 27, downstream of the fan of threads. The air return pipe 28 is connected to the air intake 29 of the blower device.

It is self-evident that certain of the elements can be located at other points in the device so long as the recycling process is unchanged. In particular, it is possible to exchange the locations of the blower casing 31 and air recovery casing 27, in which case the air is circulated in the opposite direction to that shown in FIG. 3. The advantage of this modification is that it avoids the problems of the fan of filaments moving away from the sizing roller under the effect of the air flow arriving directly onto said fan. On the contrary, the air flow arriving laterally after being deflected by the deflector wall holds the fan against the sizing roller. The condensers are then placed such that they are in the air recovery casing in the center.

In addition, the heating elements 21 may be located at the outlet or at the inlet of the turbine or blower 18, the condensers 20 then being located in the air recovery casing 27, or in the air return pipe 28 before said blower 18 and said heating elements 21. All these arrangements are illustrative but not limiting. For example, in addition to the above-mentioned elements, it is also possible to provide devices for measuring the hygrometry, the temperature and the flow rate of the air, for example at the air intake at the outlet of the heater block, and at the fan of filaments.

The results of tests show that fans formed of from a few hundred to a few thousand filaments having diameters ranging from 5 to 24 µm and moving at speeds from 4 to 60 m/s can be dried. Liquid masses which can range from 0.2 to 15 g/s are dried, irrespective of the type of size used.

The following examples illustrate the test results but are not exhaustive.

In both examples, the air is recycled, a high-temperature ventilator is used, and the air is heated by a battery with spiral wound nickel carbide elements located upstream of the ventilator. The system is supplied with 380 volts of three-phase current and the nominal power delivered can be up to 42 kW.

The chamber is likewise provided with two movable, cooled copper condensers placed in the recovery casing downstream of the fan of fibers. The condensates are evacuated via the bottom of the chamber. The water is supplied and evacuated via hoses.

The air blower casing terminates in a trapezoidal aperture adapted to the passage of the fan of fibers, and the chamber mounted on the moving chassis has two apertures allowing the taking of air, one downstream and one upstream of the fan of fibers, enabling the hygrometry of the circulating air to be measured.

EXAMPLE 1

In this example, a die with 400 holes and fed with glass balls is used to manufacture glass thread windings at a rate of 370 kg per day.

The initial moisture on the filaments before drying is approximately 20%.

Table I shows the residual moisture after drying as a function of the diameter of the filaments, the temperature of the air used for the drying process, and the air speed.

Table II compares the results obtained with or without drying according to the invention, with respect to the residual moisture in the windings, the loss due to heating and the occurrence of migration phenomena if additional drying of the windings is performed. Drying according to the invention further enables savings to be made with respect to the amount of size applied since it fixes the active constituents on the filaments immediately after deposition of the size and thus avoids excess size having to be used to compensate for subsequent losses owing to friction.

Table II thus also shows the saving on size achieved by virtue of the drying process according to the invention with respect to the process which does not employ said drying process.

TABLE I

| Diameter (in µ) | Air temperature (in °C.) | Air Speed (in m/s) | Moisture % on winding |
| --- | --- | --- | --- |
| 14 | 20 | 0.0 | 3.4 |
|  | 600 | 3.5 | 0.8 |
|  | 600 | 5.5 | 0.5 |
| 17 | 20 | 0.0 | 5.3 |
|  | 450 | 5.5 | 0.7 |
|  | 550 | 3.5 | 0.5 |
| 24 | 20 | 0.0 | 7.5 |
|  | 350 | 5.5 | 0.6 |
|  | 450 | 3.5 | 0.6 |

TABLE II

| Diameter (in µ) | Drying | Moisture % | Loss in % Owing to Heating | Migration | Saving % |
| --- | --- | --- | --- | --- | --- |
| 14 | No | 3.4 | 0.5 | Yes |  |
|  | Yes | 0.5 | 0.65 | No | 23 |
| 24 | No | 7.5 | 0.4 | Yes |  |
|  | Yes | 0.4 | 0.85 | No | 53 |

EXAMPLE 2

In this example, a die with 800 holes and fed with glass balls is used to produce glass thread windings at a rate of 450 per day.

The initial moisture on the filaments before drying is approximately 20%. Tables III and IV show the results of these tests on the same model as tables I and II of the previous example.

TABLE III

| Diameter (in µ) | Air temperature (in °C.) | Air Speed (in m/s) | Moisture % on winding |
| --- | --- | --- | --- |
| 14 | 20 | 0.0 | 6.0 |
|  | 450 | 5.5 | 0.8 |
|  | 500 | 3.5 | 0.3 |
| 17 | 20 | 0.0 | 10.0 |
|  | 450 | 5.5 | 0.9 |
| 24 | 20 | 0.0 | 12.0 |
|  | 350 | 5.5 | 0.9 |
|  | 450 | 3.5 | 0.4 |

TABLE IV

| Diameter (in µ) | Drying | Moisture % | Loss in % Owing to Heating | Migration | Saving % |
| --- | --- | --- | --- | --- | --- |
| 14 | No | 3.67 | 0.45 | Yes |  |
|  | Yes | 0.3 | 0.5 | No | 47 |
| 17 | No | 7 | 0.5 | Yes |  |
|  | yes | 0.9 | 0.8 | No | 37.5 |
| 24 | No | 12 | 0.5 | Yes |  |
|  | Yes | 0.4 | 0.7 | No | 29 |

The results obtained show the efficiency of the drying according to the invention and the saving of size realized as well as the elimination of the migrating problems in the windings.

The threads produced and treated according to the method are intended for various applications. They can be used in particular to form rovings, mats, fabrics, prepregs or composites.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. Method of producing and treating at least one glass thread, comprising the steps of:

drawing a number of thin streams of molten glass from a number of apertures disposed at a base of a die plate;

forming the streams into at least one fan of continuous filaments moving from the die plate;

depositing a size composition on the at least one fan of filaments;

reducing the moisture content of at least one current of air;

controlling an amount of moisture on the at least one fan of filaments by subjecting the at least one fan of filaments having a size deposited thereon to the at least one current of air directed onto the at least one fan of filaments and substantially transversely to directions in which said filaments move; and combining the filaments of the at least one fan of filaments, having size deposited thereon, into at least one thread, wherein said step of subjecting said at least one fan of filaments to the at least one current of air is performed before the filaments of said at least one fan of filaments are combined to form the at least one thread.

2. Method according to claim 1, including the step of adjusting at least one parameter from the group consisting of a flow rate, the moisture content and a temperature of the at least one current of air directed onto the at least one fan of filaments.

3. Method according to claim 2, wherein the flow rate of the at least one current of air is not greater than 1 $Nm^3/s$.

4. Method according to claim 2, wherein the temperature of the at least one current of air is between 20° and 600°.

5. Method according to claim 1, including the step of winding the at least one thread onto a rotating support.

6. Method according to claim 1, including the step of cutting the at least one thread by means of an anvil wheel and a blade-carrier wheel.

7. Method according to claim 1, including the step of:

extruding and transporting a thermoplastic organic material at the same time as the thin streams of glass are drawn, wherein the paths followed by the glass filaments and the organic material converge toward one another; and combining the filaments and organic material to form at least one composite thread.

8. Method according to claim 1, including the step of recycling the at least one current of air.

* * * * *